US012164877B2

(12) United States Patent
Shevelev et al.

(10) Patent No.: US 12,164,877 B2
(45) Date of Patent: Dec. 10, 2024

(54) USER DISCUSSION ENVIRONMENT INTERACTION AND CURATION VIA SYSTEM-GENERATED RESPONSES

(71) Applicant: Oracle International Corporation, Redwood Shores, CA (US)

(72) Inventors: Oleg Gennadievich Shevelev, Chislehurst (GB); Alberto Polleri, London (GB); Marc Michiel Bron, London (GB)

(73) Assignee: Oracle International Corporation, Redwood Shores, CA (US)

( * ) Notice: Subject to any disclaimer, the term of this patent is extended or adjusted under 35 U.S.C. 154(b) by 158 days.

(21) Appl. No.: 17/470,179

(22) Filed: Sep. 9, 2021

(65) Prior Publication Data

US 2022/0391595 A1 Dec. 8, 2022

Related U.S. Application Data

(60) Provisional application No. 63/202,240, filed on Jun. 2, 2021.

(51) Int. Cl.
*G06F 17/00* (2019.01)
*G06F 40/40* (2020.01)
*G06N 5/022* (2023.01)
*G06N 5/04* (2023.01)

(52) U.S. Cl.
CPC ............. *G06F 40/40* (2020.01); *G06N 5/022* (2013.01); *G06N 5/04* (2013.01)

(58) Field of Classification Search
CPC ........... G06F 40/40; G06N 5/022; G06N 5/04
USPC .............................................................. 704/9
See application file for complete search history.

(56) References Cited

U.S. PATENT DOCUMENTS

| | | | | |
|---|---|---|---|---|
| 2009/0162824 A1* | 6/2009 | Heck | ....................... | G06Q 10/10 434/362 |
| 2014/0222928 A1* | 8/2014 | Scholtes | .................. | H04L 51/48 709/206 |
| 2020/0134414 A1* | 4/2020 | Chan | ....................... | G06N 3/042 |
| 2020/0211709 A1* | 7/2020 | Devesa | ................... | G16H 40/20 |
| 2021/0081503 A1* | 3/2021 | Tran | ........................ | G06N 3/08 |

(Continued)

OTHER PUBLICATIONS

"Amazon Kendra-Highly accurate intelligent search service powered by machine learning," Amazon, accessed at https://aws.amazon.com/kendra/, accessed on Sep. 10, 2021, pp. 9.

(Continued)

*Primary Examiner* — Paul C McCord
(74) *Attorney, Agent, or Firm* — Invoke

(57) ABSTRACT

Techniques for interacting with users in a discussion environment are disclosed. Upon identifying a question in the discussion environment, a system determines: (a) whether a stored answer has already been associated with the question, (b) whether an answer can be generated by the system using existing information accessible to the system, or (c) whether to contact an expert to answer the question. The system updates the knowledge base by storing the questions and answers, along with user feedback to the questions and answers. Based on the user feedback, the system determines whether to modify existing answers to user-generated questions or to seek answers from additional human experts.

17 Claims, 7 Drawing Sheets

(56) References Cited

U.S. PATENT DOCUMENTS

2022/0121710 A1* 4/2022 Rosenthal ......... G06F 16/90332

OTHER PUBLICATIONS

"Frequently asked questions (FAQ)," Salesforce, accessed at https://www.salesforce.com/uk/products/community-cloud/faq/, accessed on Sep. 10, 2021, pp. 4.

"Oracle Digital Assistant," Oracle, accessed at https://www.oracle.com/chatbots/, accessed on Sep. 10, 2021, pp. 15.

"Welcome to Oracle Communities," Oracle Communities, accessed at https://community.oracle.com/hub/, accessed on Sep. 10, 2021, p. 1.

Steen, H., et al., "Semantic Search in Azure Cognitive Search," Microsoft, accessed at https://docs.microsoft.com/en-us/azure/search/semantic-search-overview, Sep. 9, 2021, pp. 5.

\* cited by examiner ns with community members in accordance
USER DISCUSSION ENVIRONMENT INTERACTION AND CURATION VIA SYSTEM-GENERATED RESPONSES

BENEFIT CLAIMS; RELATED APPLICATIONS; INCORPORATION BY REFERENCE

This application claims the benefit of U.S. Provisional Patent Application 63/202,240, filed Jun. 2, 2021, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to a system that interacts with community members in user discussion environments. In particular, the present disclosure relates to a system that identifies questions in an electronic discussion environment and determines a course of action for generating answers to the questions. The system provides the answer to the discussion environment and updates answers based on feedback of community members.

BACKGROUND

Community members often encounter issues while working on different tasks or solving problems for which the community members seek answers. Inputting questions directly to a search box rarely provides relevant results. Asking a question in a chat application or a user discussion forum is occasionally helpful. However, a community member needs to know which forums will include the experts able to help the user.

Part of the problem is that knowledge is often scattered across different systems. For example, in a single organization, answers may be found in documentation, in presentations, in source code, in tickets, and in chat applications. Other communities may have answers scattered across different channels, sections, topics, and external webpages. In addition, information is not always easily accessible to a user. Information may not be presented in a way that is understandable to the user. Further, users do not always know the keywords or phrases to trigger accurate knowledge retrieval.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
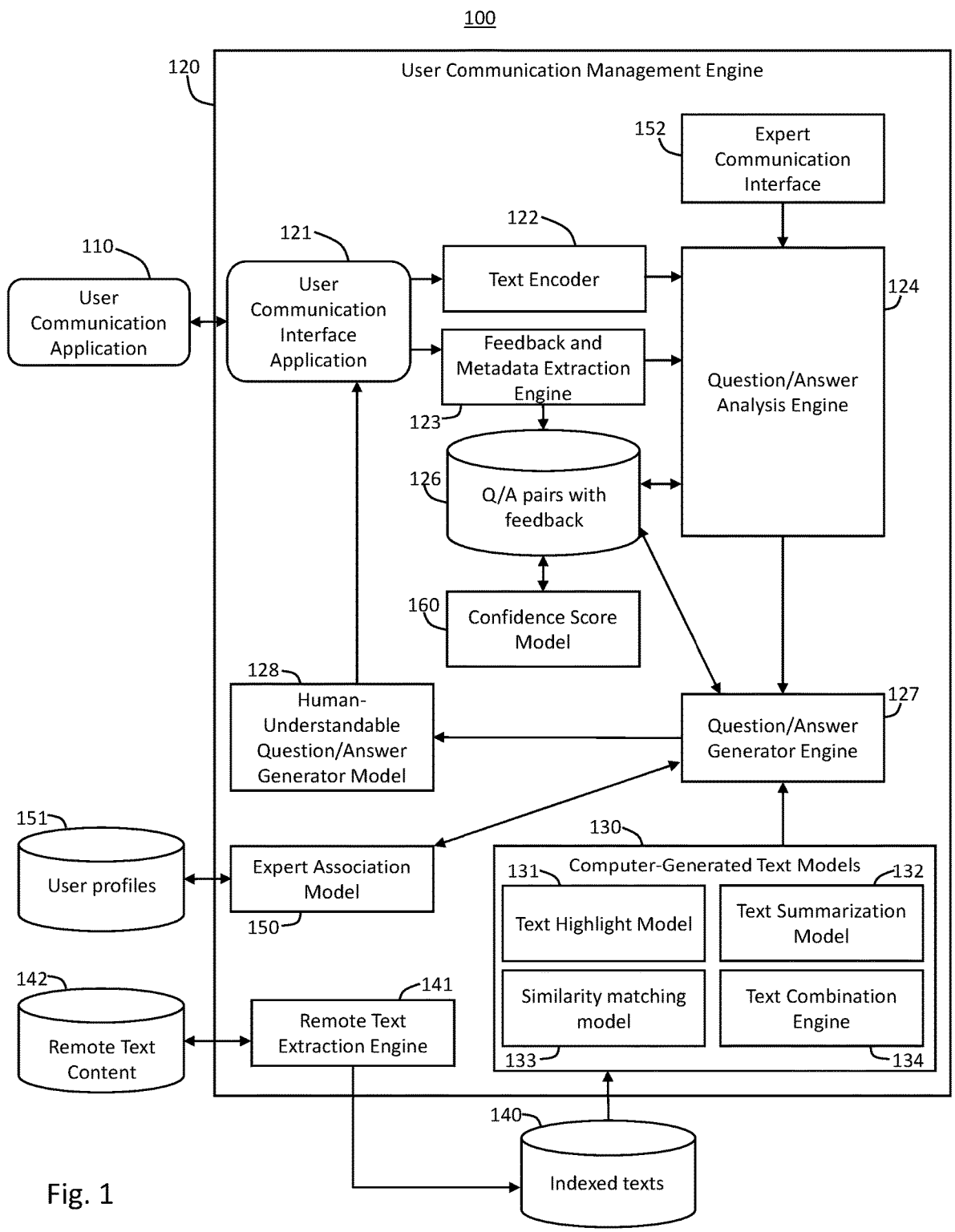
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. System Architecture
3. Generating Answers to User-Generated Questions
4. Training a Machine Learning Model
5. Example Embodiment
6. Computer Networks and Cloud Networks
7. Miscellaneous; Extensions
8. Hardware Overview

1. General Overview

One or more embodiments interact with users in a discussion environment. The system contributes to the generation and growth of a knowledge base by composing responses to user questions. Upon identifying a question in the discussion environment, the system determines: (a) whether a stored answer has already been associated with the question, (b) whether an answer can be generated by the system using existing information accessible to the system, or (c) whether to contact an expert to answer the question. The system updates the knowledge base by storing the questions and answers, along with user feedback to the questions and answers. Based on the user feedback, the system determines whether to modify existing answers to user-generated questions or to seek answers from alternative experts. In one embodiment, the system generates an answer by combining content from multiple different answers. For example, the system may determine that two separate user answers stored in a data repository have content necessary to generate the answer to the question in the discussion environment. Alternatively, the system may combine content from a previously-stored user answer and one or both of external content—such as web content—or expert-generated content.

The system may be implemented with a conversational bot. The conversational bot has a user account that monitors a user discussion environment. The system may be implemented as a component of the platform itself that presents the user discussion environment. Examples of discussion environments include group discussion forums, group chat forums, group messaging applications, and a search field in which users can enter a question or information. The bot interacts with users in the discussion environment to ask clarifying questions and answer questions.

The system utilizes multiple machine learning models to perform operations. The output of one machine learning model is used by another model to generate additional information. A question/answer encoding model is trained by a data set comprising: (a) user attribute information, and (b) question and answer information. The question and answer information includes the human-readable text associated with the questions and answers, as well as feedback provided by users associated with the questions and answers. The question/answer encoding model generates embedded questions and answers. The monitoring bot may provide new comments in the discussion environment to the question/answer encoding model to generate embeddings of the comments. A question/answer detection model analyzes the embedding output from the question/answer encoding model to identify questions and answers among the user comments in the discussion environment. The question/answer detection model may also identify query terms such as key words, important topics, and other attributes that provide information for determining how to answer the question.

Upon identifying a question, the system determines how to answer the question. The system may identify the same, or a similar, question stored with a previously-generated answer. Accordingly, the system posts the existing answer in the discussion environment. When an answer does not already exist, the system may generate an answer using available information, or the system may seek help from an expert. A similarity matching model searches data sources to identify information that is relevant to the user-generated question. Examples of data sources include: previously-generated user answers in the discussion environment, previously-generated user answers in other environments or applications, and articles and publications stored by the system or located in remote storage devices, such as over the Internet. An example of a similarity matching model is a dot-product similarity matching model.

In one or more embodiments, a text-summarizing model summarizes relevant text from one or more data sources. An answer-generating model converts text from data sources into a human-readable answer. When the system determines that it lacks the information required to generate an answer, an expert-identification model identifies one or more experts having attributes that match the user-generated question. The system contacts the expert(s) to provide an answer to the user-generated question.

In one or more embodiments, a confidence score model generates a confidence score for the system-generated answers and expert-generated answers. The confidence scores are updated based on user feedback in the discussion environment. The system may generate additional answers for user-generated questions based on a change in a confidence score of an answer. Likewise, the system may contact a new expert to answer a question based on a change in a confidence score of an expert-generated answer.

One or more embodiments generate and post system-composed answers to user-generated questions in user discussion environments. The system monitors a set of user discussion environments to detect user-generated questions and user-generated answers. When the system detects a new user-generated question, the system composes a response by combining two or more user-generated answers that were posted on the set of user discussion environments. The two or more user-generated answers may be selected for generating the system-composed answer based on user community feedback regarding relevancy or accuracy of the two or more user-generated answers. The user-generated answers may be selected based on a characteristics or known expertise of the users that posted the user-generated answers.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a user communication application 110 and a user communication management engine 120. Examples of user communication applications 110 include user discussion environments, group messaging applications, chat applications, and a search field in which a user may enter questions and information and interact with results.

The user communication management engine 120 includes a user communication interface application 121. In one embodiment, the user communication interface application 121 is a bot service that utilizes a user account in the user communication application 110 to monitor comments posted in a conversation thread or environment of the user communication application 110. The bot may monitor chat channels, forums, tickets, or any user communication application 110 which is presented as a flow of messages with replies. In one embodiment, the bot monitors and responds to messages in live conversations. In addition, or in the alternative, the bot may monitor and respond to indexed webpages and static documents. The bot may be a proactive agent programmed to act similar to a human user. The bot identifies questions in the user communication application 110 including the flow of messages with replies. The bot posts answers to the questions using a user account. In one embodiment, the bot monitors the user communication application 110 and generates replies and answers without receiving additional human input. In addition, the user communication management engine 120 may identify questions that require expert-generated answers. The bot may respond to questions in the user communication application 110 using the expert-generated answers. Alternatively, the user communication management engine 120 may prompt experts to interact directly with the user communication application 110 without providing answers via the bot.

The user communication interface application 121 extracts content from the user communication application 110. For example, in an embodiment in which the user communication application 110 is a text chat forum, the user communication interface application extracts the posts and replies in the forum, as well as associated user feedback and available metadata.

A text encoder 122 applies a machine learning model to encode text content extracted by the user communication interface application 121 from the user communication interface application 121. The text encoder 122 converts human-readable questions and answers into embedded values that are readable by machine learning engines. The embedded values may further be searchable by one or more search programs. For example, text words may be converted into numerical values and vector values. In one embodiment, the text encoder employs a bidirectional encoder representations from transformers (BERT) model. The BERT model receives as an input a set of text, identifies relationships among the words in the set of text, and outputs an embedded vector that includes values representing the text and the relationships among the words in the text.

The text encoder 122 analyzes content extracted by the user communication interface application 121 from the user communication application 121 to identify content that corresponds to a question and content that corresponds to an answer. In one embodiment, the content includes human-readable text. The text encoder 122 may employ a machine learning model trained to recognize groupings of text that either expressly or implicitly include a question. The model may take as inputs punctuation, such as a question mark, and sentence structure to determine whether particular text corresponds to a question. To determine whether a candidate text is an answer to a question, the model may take as inputs content from an identified question, content of the candidate text, and vicinity of the candidate text to a question in a conversation. For example, the model may identify both of the following as questions: "How can I improve my website's ranking?" and "I need to improve my website's ranking." In one embodiment, a question/answer identification model is an attention-based recurrent neural network machine learning model. In an example embodiment, the machine learning model is trained using the Stanford Question Answering Dataset (SQuAD) as well as a body of question/answer pairs, feedback, and metadata extracted form the user communication application 110.

A feedback extraction engine 123 extracts the feedback information from the content extracted by the user communication interface application 121 from the user communication application 110. Examples of feedback include: user-interactive indications of the helpfulness of a question or reply (e.g., user interface icons indicating like/dislike, helpful/not helpful, recommend, star), a number of replies to a post, and citations to a particular post or reply in other posts and replies.

A question and answer analysis engine 124 analyzes questions and answers to initiate actions associated with the questions and answers. The question and answer analysis engine 124 pairs a single question with a single answer and stores the pairing in the data repository 126 together with any associated feedback. In one embodiment, a single answer is made up of multiple separate comments made by a same user. In one embodiment, any comments made by different users are stored in separate question and answer pairs. The question/answer pairs may include human-readable questions and answers or machine-readable embeddings representing question/answer pairs. Each question/answer pair includes a question and an answer corresponding to the question. The question may be a question obtained from the user communication application 110 or from other data sources. For example, the system 100 may access Internet-based or cloud-based question/answer applications and sites to obtain questions and answers. The answers in the question/answer pairs may be user-generated, system-generated, or obtained from Internet-based or cloud-based sources external to the system 100. In one embodiment, feedback, including user reactions, a number of replies, etc., and other metadata including a reputation score of a user, is stored in the data repository 126 in a separate table from the question and answer pairs. The tables may be linked to associate a particular set of feedback and metadata with a particular question and answer pair.

In one embodiment, user attributes from user profiles stored in the data repository 151 and the question/answer pairs, including user feedback attributes and metadata comprise a training dataset to train a machine learning model employed by the text encoder 122. Answers and comments given by the machine or humans can be up-voted or down-voted. This information, plus implicit feedback (clicks, number of comments, pages visited, how long people stayed on the page, etc.), are used as features in the training dataset, which helps continuously re-train and improve the question/answer models.

The question and answer analysis engine 124 initiates the actions using one or more machine learning models trained to perform a particular task. For example, the question and answer analysis engine 124 may analyze content in a question and determine that the question contains insufficient information to generate an answer. The question and answer analysis engine 124 may send the encoded question and the determination of the need for additional information to the question and answer generator engine 127 to generate a follow-up question. As another example, the question and answer analysis engine 124 may analyze a question and determine that: (a) the question corresponds to an existing question/answer pair stored in the data repository 126, (b) the question may be answered based on indexed text data stored in the data repository 140, or (c) the question requires additional expert input to generate an answer.

In an embodiment in which the question and answer analysis engine 127 determines a question may be answered based on indexed text data, the question and answer generator engine 127 employs one or more computer-generated text models 130 to generate an answer to a question.

A text-summarization model 132 applies a machine learning model to text to generate a summary of the text. In one embodiment, the machine learning model employs a text highlighting model 131 that identifies important sentences from a body of text and generates the summary by using only the important sentences, while omitting the remaining sentences of the body of text. In addition, or in the alternative, the text-summarization model 132 may employ an abstractive algorithm that generates an embedded vector associated with the meaning of the text and applies natural language processing (NLP) to generate new sentences that capture the meaning of the text. In one or more embodiments, the text-summarization model 132 identifies query data, such as a subject or key topic, in an embedded question. The question and answer generator engine 127 identifies relevant text in one or more data sources, such as in the indexed texts stored in the data repository 140, remote text content stored in a data repository 142, or other data sources external to the user communication management engine 120. The question and answer generator engine 127 applies the text-summarization model 132 to the identified text to generate a summary of the text. The question and answer generator engine 127 may provide the summary of the text, with a link to the entire text, to the human-readable question and answer generator model 128 to generate a human-readable answer including the summary of the text. The user communication interface application 121 generates a comment or reply, that includes the human-readable answer, in the user communication application 110.

The human-readable question and answer generator model 128 is applied to question and/or answer content from the question and answer generator engine 127 to generate an answer in a human-readable form. For example, the question and answer generator engine 127 may generate answer content as a vector including one or more alphanumerical and vector values. The human-readable question and answer generator model 128 converts the content embedded in the vector into a human-readable form, such a paragraph of text data, images, and links to images or articles. In one embodiment, the human-readable question and answer generator model 128 is a GPT-3 type model.

A similarity matching model 133 generates similarity scores of an embedded question with embedded answers obtained from the user communication application 110 to identify answers having the highest similarity to a particular question. In one embodiment, the similarity matching model 133 is a dot-product similarity matching model. The user communication management engine 120 may store similarity rankings for each question/answer pair. In one embodiment, the question and answer generator engine 127 transmits to the human-understandable question and answer generator model 128 the answer having the highest similarity to a particular question. The human-understandable question and answer generator model 128 generates a human-understandable answer. The user communication interface application 121 posts the human-understandable answer in the user communication application 110.

In one embodiment, the question and answer generator engine 127 employs a text combination engine 134 to generate an answer using text from multiple different sources. For example, if the question and answer generator engine 127 determines that an answer stored in the data repository 126 is incomplete and indexed text 140 would complete the answer, the text combination model 134 may combine answer content from the data repository 126 and the indexed texts 140. In one embodiment, the text combination engine 134 combines embedded vectors representing the text segments into a coherent answer.

In one embodiment, a remote text extraction engine 141 extracts remote text content from sources external to the user communication management engine 120. Examples of remote sources include data repositories 142, such as servers and databases, connected to the user communication management engine 120 via a local area network or wide area network, such as the Internet. The remote text extraction engine 141 may index the extracted data and store the indexed content in the data repository 140 to be accessed by the user communication management engine 120.

When the question and answer analysis engine 124 determines that an expert input is required or recommended to answer a particular question, the question and answer analysis engine 124 may employ the expert association model 150. The expert association model 150 identifies a relevant expert or set of experts for a particular question. For example, expert attributes may be embedded from user profiles stored in the data repository 151. Examples of expert attributes include areas of expertise, experience, reputation among other users, and reputation among other experts. A data set of expert attributes may be used to train the model 150. When an embedded question is provided to the model 150 by the question and answer analysis engine 124, the model 150 generates a set of one or more experts that are most likely to be able to answer the question. In one embodiment, the expert association model 150 generates a communication to an expert, via the expert communication interface 152, requesting an answer. For example, the question and answer generator engine 127 may generate embedded content for a request for expert input based on the expert identified by the expert association model 150. The human-understandable question and answer generator model 128 may generate a message to the expert. For example, the model 128 may generate a message that says: "A user recently posted in X application asking about Y. We noticed that Y is one of your specialties. Would you be willing to draft a response to the user?" The expert communication interface 152 may send the message to the expert via email, text message, instant message, or any other communications means. The expert may post an answer directly in the user communication application 110. Alternatively, the expert may provide an answer to the user communication management engine 120 via the expert communication interface 152. In such an embodiment, the user communication interface application 121 may post the expert answer.

A confidence score model 160 generates confidence scores for system-generated answers and expert-generated answers. The confidence score represents a likelihood that the answer adequately addresses issues, topics, and concerns raised in a question. The confidence score model 160 may be updated based on user feedback. For example, the question and answer generator engine 127 may generate an initial answer to a question in the user communication application 110. The confidence score model 160 may determine, based on the content of the answer, that it has a confidence score that exceeds the threshold. Based on receiving negative user feedback, the confidence score model 160 may reduce the confidence score of the answer. Negative feedback may include user interaction with an icon representing negative feedback (e.g., "dislike" icon), low traffic to the answer, lack of references to the answer in other comments, and textual user responses to the answer that contain negative comments. In one embodiment, the user communication management engine 120 re-trains the confidence score model 160 to account for the updated confidence score. In one embodiment, reducing the confidence score of the answer results in generating a new answer or seeking an answer from an expert. For example, if the confidence score for an answer is reduced below a threshold, the question and answer generator engine 127 may provide question content to the expert association model 160 to identify a relevant expert for the associated question.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 126, 140, 142, and 151 is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as the user communication management engine 120. Alternatively, or additionally, a data repository may be implemented or executed on a computing system separate from the user communication management engine 120. A data repository may be communicatively coupled to the user communication management engine 120 via a direct connection or via a network.

In one or more embodiments, the user communication management engine 120 refers to hardware and/or software configured to perform operations described herein for analyzing user communications, analyzing stored answers, determining whether stored answers correspond to user-generated questions, and initiating actions based on the determination. Examples of operations for generating system-generated answers to user-generated questions are described below with reference to FIGS. 2A, 2B, and 2C.

In an embodiment, the user communication management engine 120 is implemented on one or more digital devices.

The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the user communication management engine 120 includes an interface for receiving user input. The interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface is specified in one or more other languages, such as Java, C, or C++.

3. Generating Answers to User-Generated Questions

Figure 2A:
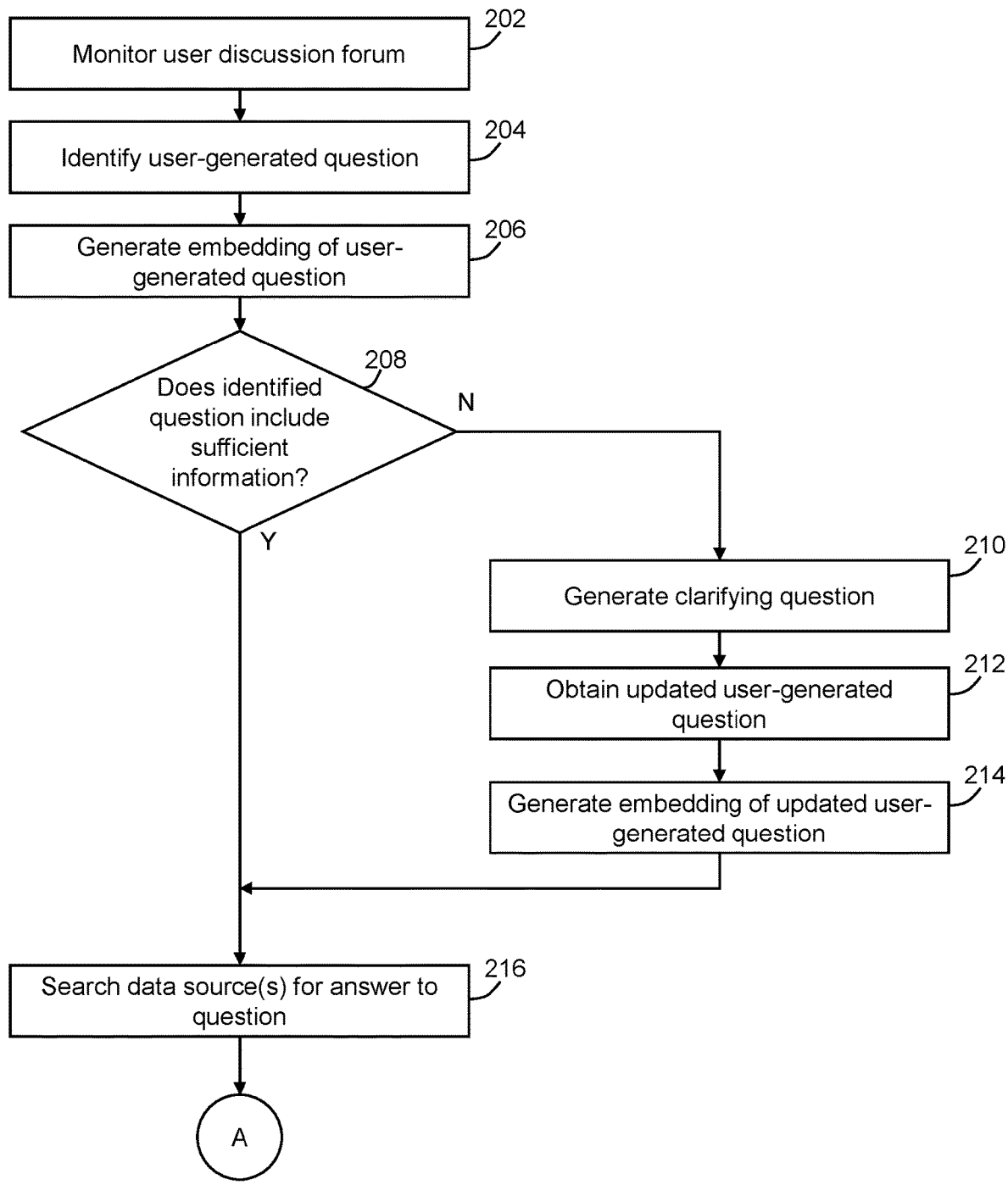
FIGS. 2A, 2B, and 2C illustrate an example set of operations for developing a knowledge base using automated interactions with community members in accordance with one or more embodiments.
Figure 2B:
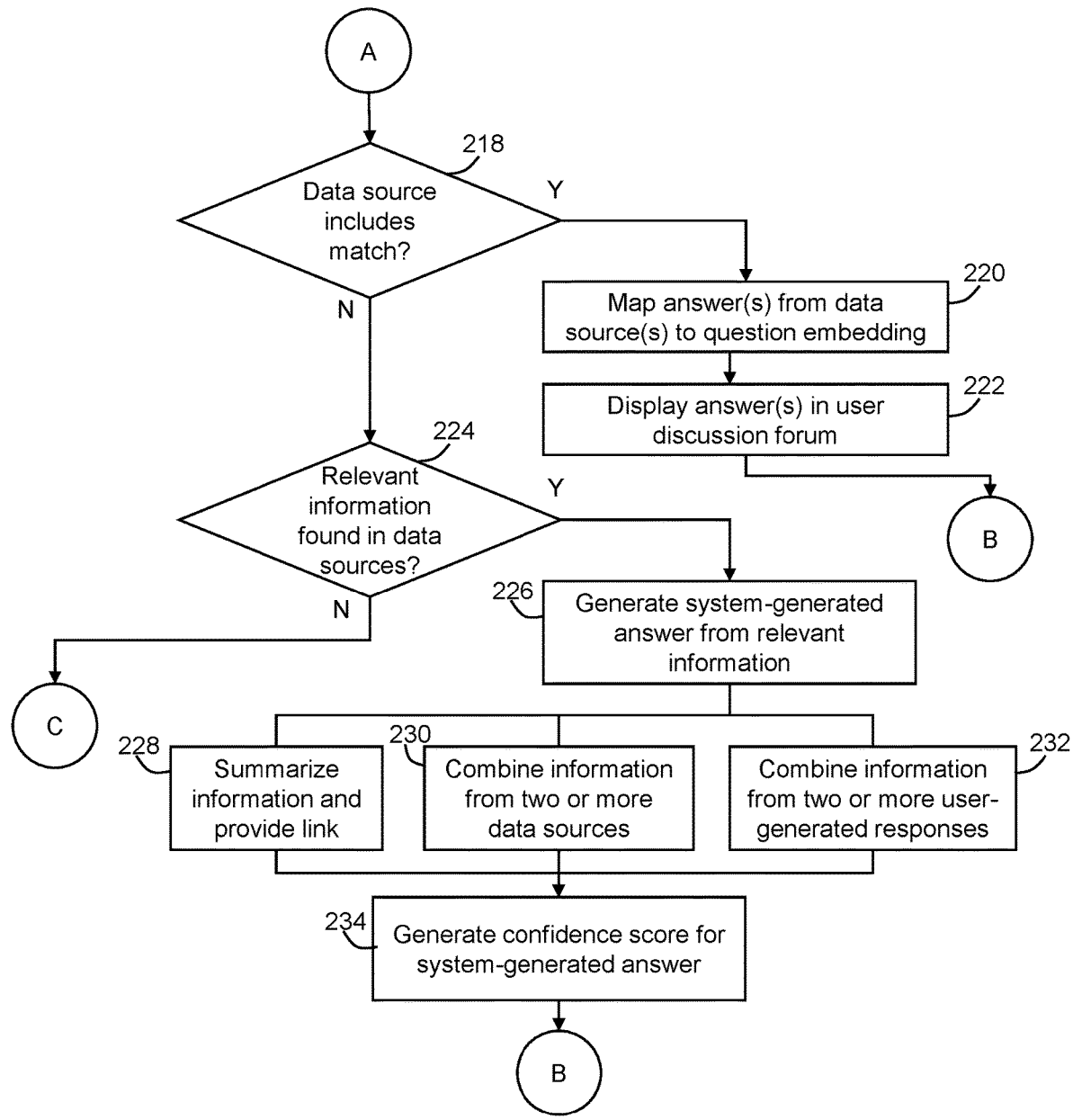
Figure 2C:
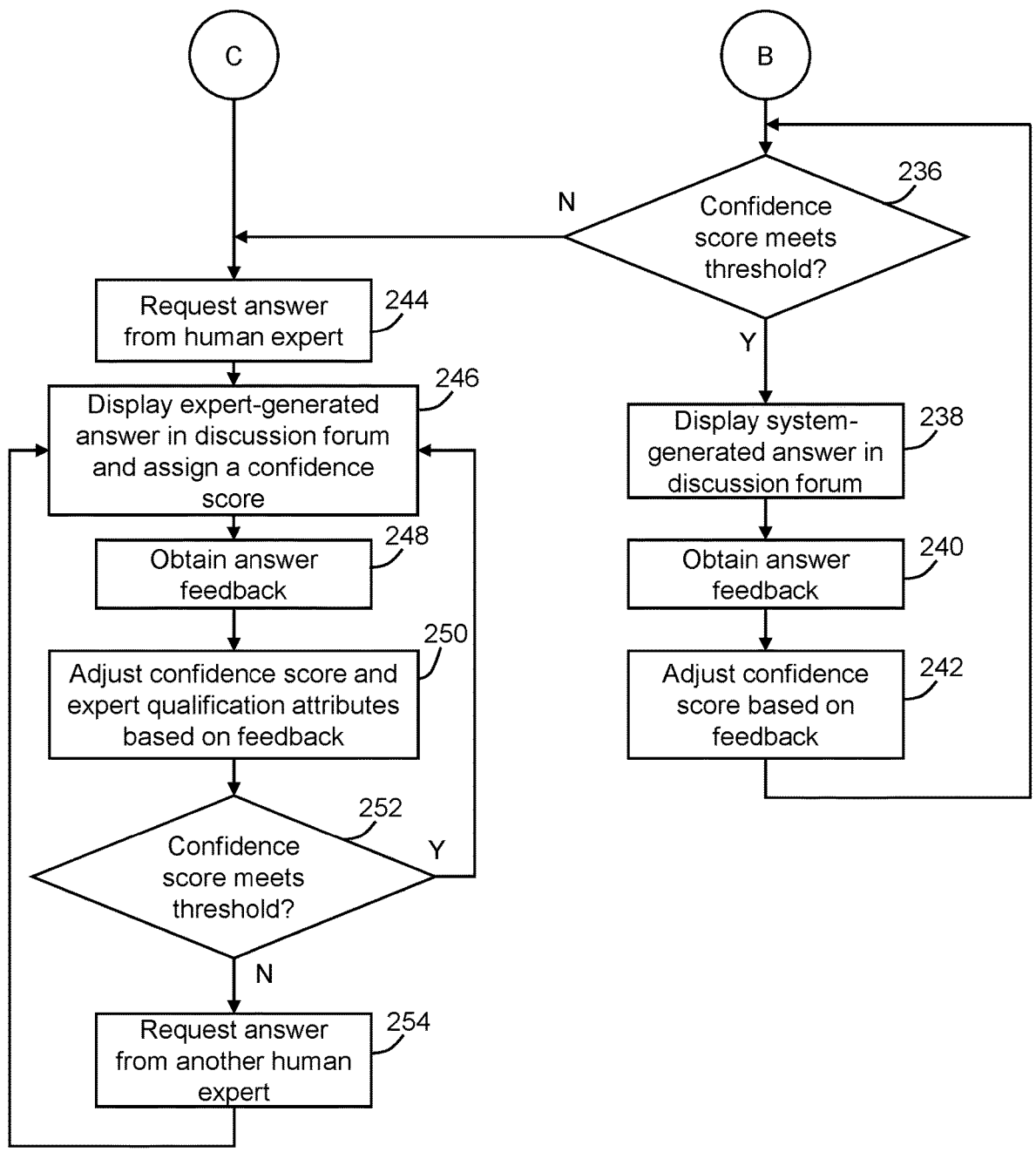

FIGS. 2A to 2C illustrates an example set of operations for automatically generating answers to user-generated questions in accordance with one or more embodiments. One or more operations illustrated in FIGS. 2A-2C may be modified, rearranged, or omitted all together. Accordingly, the particular sequence of operations illustrated in FIGS. 2A-2C should not be construed as limiting the scope of one or more embodiments.

A system monitors a user discussion environment, such as a group text thread, a group communications application, or an on-line forum (Operation 202). An organization that hosts the environment may include conversation-monitoring applications that monitor the conversations. In addition, or in the alternative, the system may generate one or more user accounts that have access to the environment. The user accounts may be used by the system to respond to questions and comments in the environment. Alternatively, an organization that does not host the environment may monitor the environment using a bot. For example, a software company may generate an account in an independent forum that posts questions associated with the software company. The software company may assign the account to a bot to automatically monitor and determine whether to respond to questions on the forum.

The system identifies a user-generated question (operation 204). For example, a machine learning model may be applied to each comment in the environment to determine whether the comment includes a question. The machine learning model may be trained to identify as questions sentences having particular sentence structures or punctuation, or combinations of sentence structure and punctuation. In addition, the machine learning model may be trained to identify sentences that are not strictly questions as including a question element. For example, a comment may include the sentence "I wish there was a way to restore the settings . . . " The machine learning model may be trained to identify in the sentence a question: "how to restore settings . . . ?"

The system generates an embedding of the user-generated question (operation 206). The embedding may include the relevant portions of the text, as well as any relevant context from the conversation. For example, a question: "How is it possible to do that?" may obtain context from a previous comment to generate the embedding. Additional information, such as a time of the comment, the type of forum, or the identity of the user asking the question may be included in the embedding.

In one embodiment, the system analyzes the embedded question to determine if additional information is needed prior to formulating a response. For example, a user may ask how to perform a particular operation, and the system may determine that the CPU information would be required to answer the question. The system may generate a response to ask for additional information prior to answering the original question. In addition, the system may analyze a question to determine if it is a type of question that should be answered. For example, if the system determines that a user is asking a rhetorical question, the system may stop processing the embedded question. In another example, the system may determine that the user asking the question is not authorized to receive an answer to the question. The system may ignore the question, or may generate a response indicating that the user is not authorized to obtain an answer.

The system determines whether the question contains sufficient information to generate an answer (Operation 208). For example, a question may state: "Why is my application so slow?" The system may determine that additional information, such as computer specifications, wireless bandwidth, geography, and Internet provider, may be required prior to generating an answer. Alternatively, the system may analyze previous conversations and analyze context to extract necessary information. The latter may require an additional confirmation from the user.

If the system determines that the question contains insufficient information to generate an answer, the system generates a clarifying question (Operation 210). In one embodiment, the system obtains embedded data representing the content of the question and the type of data that is required to be able to answer the question. The system provides the embedded data to a natural language processing (NLP) machine learning model to generate a human-readable follow-up question requesting additional information. For example, the NLP machine learning model may generate a question such as: "You're asking about the speed of your application. What type of computer are you using? What is your Internet speed?"

The system obtains an updated user-generated question (Operation 212). For example, the system may combine the original question with any follow-up answers to generate the updated user-generated question.

The system generates an embedding of the updated user-generated question (Operation 214). The embedding converts the text of the original question and any follow-up answers into corresponding alpha-numeric and vector values.

The system searches one or more data sources to determine whether an answer exists to the question (Operation 216). Data sources include: a repository of question/answer pairs, stored answers from users, stored answers generated by the system, stored answers generated by experts, informative articles and documents located in local storage or remotely, such as on a server accessed over the Internet.

The system may first search a repository of previously-stored question/answer pairs. If the no match exists in the previously-stored question/answer pairs, the system may search additional sources to determine whether the same question was previously answered.

Searching the one or more data source may include identifying query content in the user-generated question, and identifying similar query content in the answers in the data sources. The query content may include key words, topics, phrases, identification information of a user generating the question, a time at which the question was generated, and other information associated with the user-generated question. The system may encode the query content in the embedding of the user-generated question.

If the same question was previously answered, the system determines that a match exists for the particular question (Operation 220). In addition, or in the alternative, a similarity matching engine may determine that a similarity of an embedding of a question and an embedding of an answer exceeds a threshold similarity.

The system determines whether a previously-stored question/answer pair has a question that matches the user-generated question (Operation 218). If the system identifies a previously-stored question/answer pair having a question that matches the user-generated question, the system maps the answer to the user-generated question (Operation 220). In addition, if the system determines that multiple separate answers exist for questions that match the user-generated question, the system may map the user-generated question to the multiple different answers.

The system displays a matching answer in the discussion environment (Operation 222). The system may include in the answer a link to reference material, an expert, or another user that was the source of the previously-generated answer. In one embodiment, the system summarizes the answer and provides a link to the full answer, such as an article or another post in a discussion environment. When two or more answers match the user-generated question, the system may display the two or more answers separately or may combine the two or more answers into one answer in the discussion environment. For example, the system may display one answer using one user account and another answer using a different user account. The system may analyze the multiple answers to identify overlapping content. When merging the previously-generated answers into one answer, the system may modify the previously-generated answers to omit overlapping content. When two separate answers associated with the same question have different content, such as conflicting instructions, the system may provide differentiating information together with the respective answer. For example, the system may indicate which answer is more highly rated in the discussion environments. In addition, or in the alternative, the system may indicate conditions associated with the respective answers. For example, the system may indicate that for a system having one set of attributes, one of the previously-generated answers applies; for a system having another set of attributes, the other previously-generated answer applies.

In an embodiment, the system utilizes a machine learning model to generate a human-readable answer. For example, question/answer pairs may be stored as embedded data comprising alpha-numeric and vector values. A natural language processing model generates a human-readable answer based on the alpha-numeric and vector values.

If an answer matching the user-generated question is not found in one or more data sources, the system determines whether the one or more data sources include information relevant to the question (Operation 224). For example, the system may analyze text data in one or more data repositories or in online publications. In one embodiment, the system identifies query content in a user-generated question, such as key words, topics, and subjects. The system may search text in stored answers, articles, and other publications to identify relevant information. In addition, or in the alternative, the system may generate embeddings of text content in previously-stored answers and other published content, such as online publications. A similarity machine learning model may be applied to the embeddings to identify relevant content.

Upon identifying relevant information, the system generates a system-generated answer to respond to the user-generated question (Operation 226). The system-generated answer utilizes relevant information from one or more data sources combined with human-readable text to structure the relevant information in an answer-type format.

In one embodiment, the system summarizes information from an information source (Operation 228). For example, the system may determine that if the relevant content is longer than a pre-defined length, such as three sentences, the system summarizes the relevant content. In one embodiment, a text-summarizing machine learning model identifies important sentences in a body of relevant content. The system generates a summary of the relevant content using only the relevant sentences. In another embodiment, a machine learning model identifies the subject of text and generates one or more new sentences, not previously found in the text, to summarize the text. The system may provide a link to the relevant content to allow a user to access the additional content that is omitted from the answer by the system.

In one embodiment, the system combines information from two or more data sources to generate an answer (Operation 230). For example, the system may identify two online articles having relevant content. The system may determine that neither article completely answers the user-generated question, and that the information in the combination of articles completely answers the user-generated question. Accordingly, the system may combine the content from the two articles into one answer. The system uses an answer-generating machine learning engine to generate a human-readable answer to the user-generated question using the combined content from the two or more data sources.

In one embodiment, the system identifies two or more user-generated answers as having content relevant to the user-generated question. The system combines the content from the multiple user-generated answers to generate a single answer (Operation 232). Combining the content includes omitting portions of the previously-generated answers that are not relevant to the user-generated question and adding text to present the answer in a human-readable format.

The system generates a confidence score for the system-generated answer to the user-generated question (Operation 234). In one embodiment, a machine learning model is applied to an embedding of the user-generated question and an embedding of the system generated answer to generate the confidence score. For example, the system may take a dot product of the embeddings and the machine learning model may generate the confidence score based on the dot product. In another embodiment, the confidence score is based on feedback. For example, the system-generated answer may be displayed in the discussion environment. Users may rate the answer based on its usefulness to answer the question. The system may generate and update the confidence score based on the user input over time. For example, an answer may have a high confidence score initially, but over time the answer may become less relevant, and the confidence score, as indicated by the user input, may decrease. Other factors that may influence a confidence score include a reliability of a data source, a staleness of the information in the data source, an identity of a data source, and an understandability of the data source.

The system determines whether the confidence score associated with the system-generated answer meets a threshold (Operation 236). For example, a threshold may correspond to a ninety-percent likelihood that the system-generated answer is adequate to answer the user-generated question.

If the system-generated answer meets the threshold, the system displays the system-generated answer in the discussion environment (Operation 238). For example, the system may post a comment in a discussion environment using an account name associated with a bot to answer user questions.

The system obtains user feedback in the discussion environment (Operation 240). The system may ask the user asking the user-generated question whether the answer was adequate to answer the user-generated question. The system may receive additional feedback including user comments, and selections of a "like," "approve," or "helpful" icon. For example, the system may utilize a machine learning model to analyze text of comments that reply to, or follow, the system-generated answer.

In one embodiment, if the user asking the user-generated question indicates the system-generated answer was not helpful, the system may generate one or more additional questions to obtain additional information from the user. For example, the system may ask the user whether the system-generated answer was understandable, whether a solution provided in the system-generated answer worked, whether the information provided in the system-generated answer was complete, or any other question to determine what the user considered to be lacking in the system-generated answer. If the user provides additional information, the system may include the user response in the query data used to identify answer content. For example, in the embodiment in which the system generates an embedding of the question, the system may include the additional user response in the embedding of the question. The system may then return to Operation 218 to determine whether any data sources match the updated question.

The system adjusts the confidence score based on the user feedback (Operation 242). For example, positive feedback may result in an increase to the confidence score. Negative feedback may result in a decrease to the confidence score. In one or more embodiments, adjusting the confidence score includes adjusting parameters of a machine learning model. For example, an embedding of the answer may initially result in a first confidence score. Based on user feedback, the system may adjust the parameters of the model, so that applying the model to the embedding results in a different confidence score. The system again determines if the confidence score meets the threshold value (Operation 236).

If the system determines in Operation 236 that the confidence score associated with the system-generated answer does not meet the threshold value, the system identifies an expert and requests an expert-generated answer to the user-generated question (Operation 244). In addition, if the system determines in Operation 224 that information relevant to the user-generated question is not found in one or more data sources, the system identifies an expert and requests an expert-generated answer to the user-generated question (Operation 244). In one embodiment, a machine learning model matches an expert to a question. For example, the model may be applied to the embedded question, and the result of the model may be the identity of one or more experts. Attributes of the expert that may contribute to selection of the expert by the model include: area of expertise, availability, usefulness of previous answers, level of experience, reputation among users, and reputation among experts.

The system displays the expert-generated answer in the discussion environment (Operation 246). The system may also assign a confidence score to the expert-generated answer. For example, the confidence score may be based on how close the expert's area of expertise is related to the subject matter of the user-generated question.

The system obtains feedback for the expert-generated answer (Operation 248) and adjusts the confidence score based on the user feedback (Operation 250). As discussed previously in connection with the system-generated answer, the system may adjust the confidence score for the expert-generated answer by adjusting parameters of a machine learning model. The system may also adjust the expert qualification attributes of the selected expert. For example, multiple negative responses to the expert-generated answer from users may result in the system downgrading the expert's ranking in a particular field. On the other hand, multiple positive responses may result in the system upgrading the expert's ranking in the field.

The system determines if the adjusted confidence score meets a threshold (Operation 252). If so, the answer is maintained in the discussion environment until additional feedback is received. If the system determines that the adjusted confidence score does not meet a threshold, the system requests another answer from another human expert (Operation 254). For example, the system may rank human experts according to their expertise and experience. If the highest-ranked expert provides an answer that is determined to be inadequate, as reflected by a low confidence score, the system may request an answer from a next-ranked human expert. In one embodiment, if a predetermined number of human experts is unable to answer a question, the system may notify a system administrator and may stop contacting human experts.

4. Training a Machine Learning Model

Figure 3:
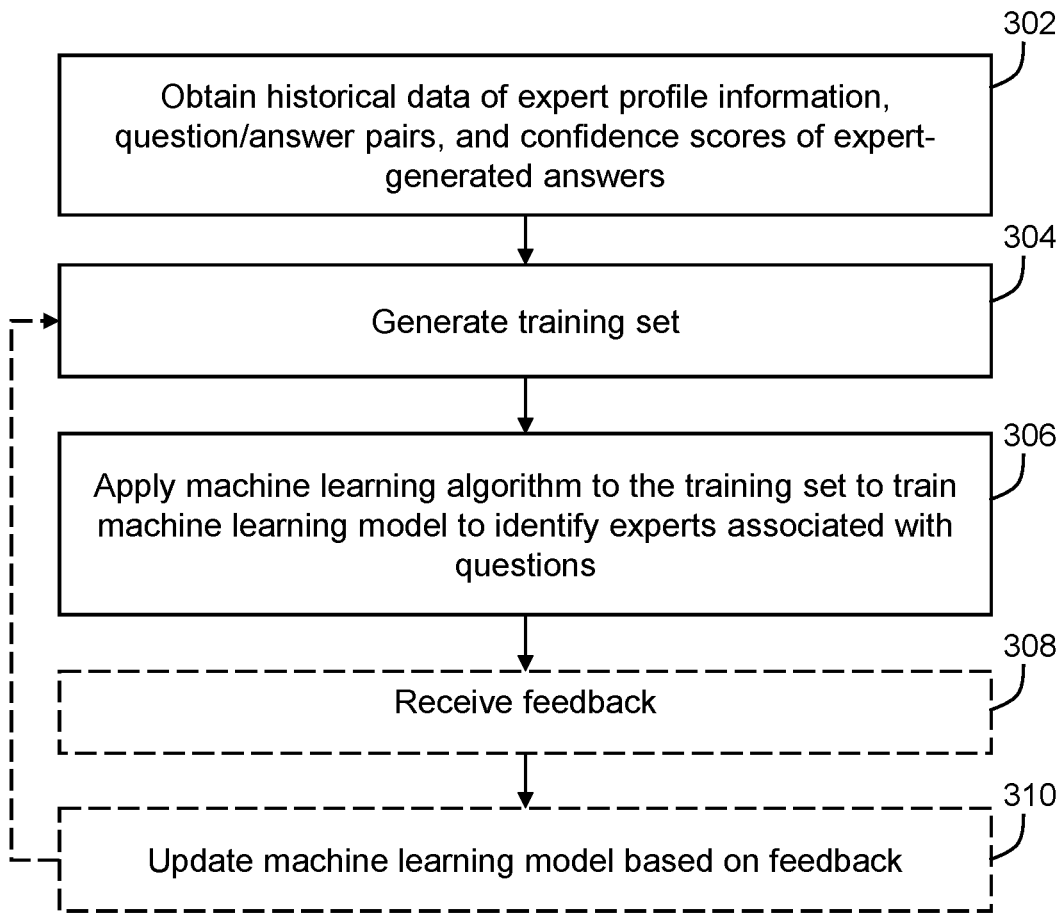
FIG. 3 illustrates an example set of operations for training a machine learning model to associate an expert with a question in accordance with one or more embodiments.

FIG. 3 illustrates an example set of operations for training a machine learning model to associate an expert with a question in accordance with one or more embodiments.

A system obtains historical data of expert profile information, question/answer pair information, and confidence scores of expert-generated answers (Operation 302). Examples of expert profile information include: areas of expertise, subject matter of questions previously answered by the expert, confidence score of answers previously answered by the expert, reputation of the expert among users, reputation of the expert among other experts, answer-quality of answers generated by the expert, and level of experience of the expert. Question/answer pairs include embeddings of content of historically-asked questions with historically-provided answers, as well as confidence scores and feedback associated with the historically-provided answers.

The system generates a training data set from the historical data (Operation 304). The training data set includes, for each set of question/answer pairs for which an expert generated an answer, the historical confidence score associated with the answer.

The system applies a machine learning algorithm to the training data set to train the machine learning model to identify experts associated with particular questions (Operation 306). The system trains the machine learning model to identify the relationships between expert attributes, question attributes, and high confidence scores. For example, the machine learning model may learn that a particular combination of expertise and user reputation corresponds to a high confidence score in one subject. The machine learning model may learn that a different combination of expertise and user reputation corresponds to a high confidence score in another subject. In one embodiment, training the machine learning model includes applying an input vector from the training data set to a neural network, obtaining an output value, comparing the output value to a value in the training set, and adjusting parameters of the neural network based on a difference between the value output from the machine learning model and the value identified in the training set.

In one embodiment, training the machine learning model includes receiving feedback for a value score generated by the machine learning model (Operation 308). For example, the system may display a particular expert associated with a set of subjects. The system may receive one or more inputs to alter which expert should be associated with particular topics. The system updates the machine learning model based on the feedback (Operation 310).

One or more operations illustrated in FIG. 3 may be modified, rearranged, or omitted all together. Accordingly, the particular sequence of operations illustrated in FIG. 3 should not be construed as limiting the scope of one or more embodiments.

5. Example Embodiment

Figure 4:
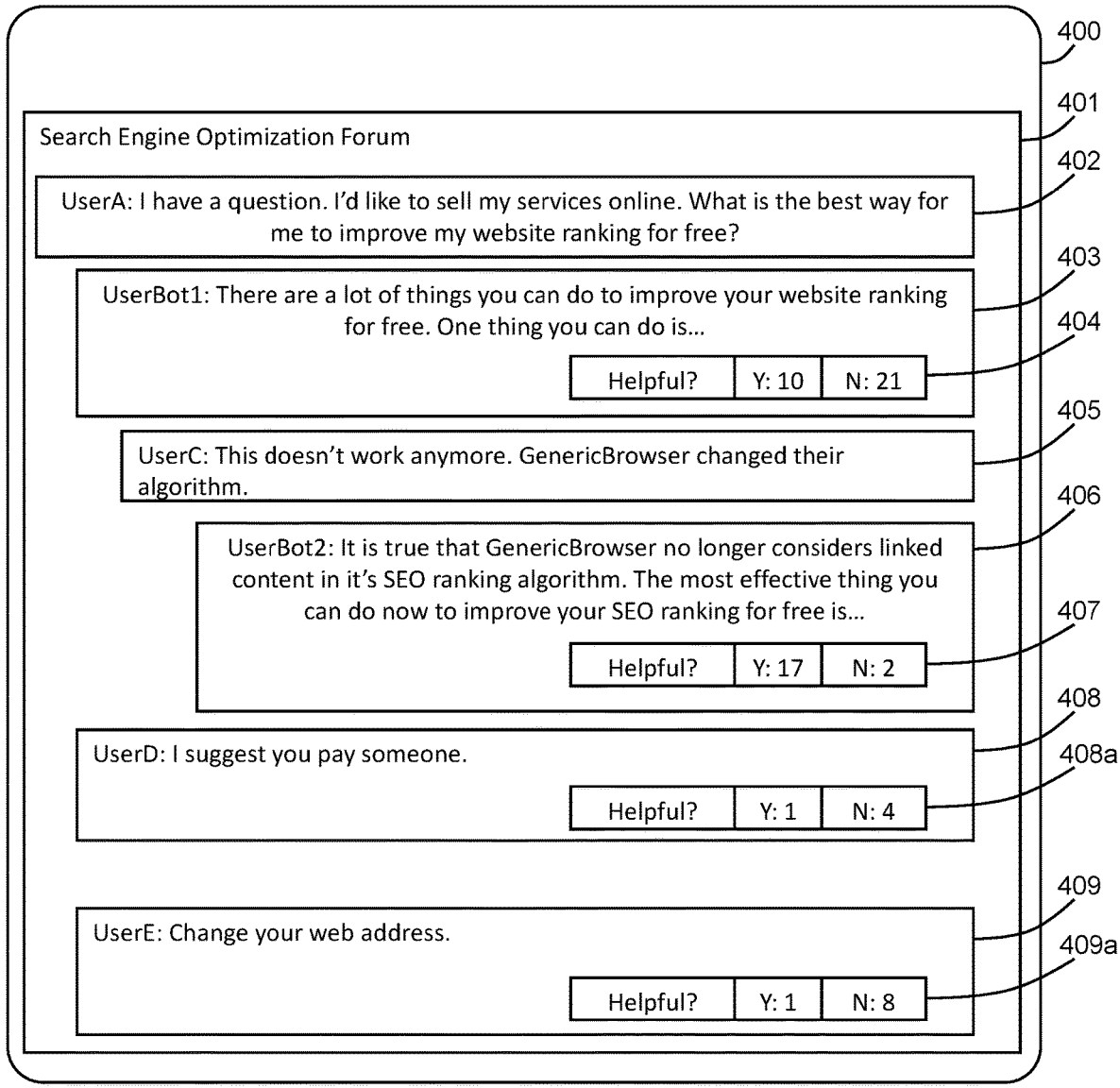
FIG. 4 illustrates a graphical user interface (GUI) of an example embodiment.

FIG. 4 is graphical user interface (GUI) according to an example embodiment.

The GUI 400 displays content for a search engine optimization forum 401. A first user, UserA, posts a question 402 associated with improving their website ranking. The system answers via an account (UserBot1) associated with a bot. The bot monitors the forum and extracts data from entries in the forum. For example, the bot extracts the text of the question 402. The system analyzes the question and generates a response 403. The GUI includes a feedback element 404. A user may interact with the feedback element 404 to either indicate that an answer is helpful or not.

Additional users (e.g., UserD and UserE) may also answer the question 402. The system may track the feedback 404, 408a, and 409a for the answers 403, 408, and 409. Over time, if the system determines that a particular generates enough highly-rated answers, the system may identify the user as an expert in a topic.

The system generates a confidence score for the answer 403 based on feedback 404 and user responses 405. For example, UserC comments in their reply 405 that the solution provided in the answer 404 no longer works. The system identifies the comment as negative feedback and reduces the confidence score. In addition, the system identifies that more users have found the comment 403 unhelpful than helpful, further reducing the confidence score. In addition to the quantity of user feedback, the system may adjust the confidence score based on a reputation of users providing feedback. For example, if UserC has a high reputation score, the system may reduce the confidence score associated with the answer 403 by a relatively high amount. If UserC has a low reputation score, the system may reduce the confidence score associated with the answer 403 by a relatively low amount. In addition, the system may determine when feedback was received to determine how to adjust a confidence score. For example, an answer 403 may receive 1,000 "helpful" feedback responses over a six-month period and no "un-helpful" responses. However, the system may receive 100 "unhelpful" feedback responses and only 10 "helpful" responses in the seventh month. The system may determine that circumstances have changed that have made the answer 403 less helpful within the last month. The system may accordingly reduce the confidence score for the answer by a relatively high amount.

Based on determining that the confidence score for the answer 403 is less than a threshold, the system may determine that a new answer is required. The system determines whether the answer may be found in indexed text data or whether an expert is required. The system generates a new answer 406 based on the indexed text data or the expert contribution. The system receives additional feedback 407 and updates the confidence score for the answer 406 accordingly. While the embodiment of FIG. 4 shows the answer 406 provided by UserBot2, in an alternative embodiment, an expert may enter an answer directly into the forum 401 without providing an answer to the system. The system may extract the expert answer 406 from the forum 401 using the bot. The system may index the expert answer, generate a confidence score, and update the expert profile based on the confidence score.

One or more embodiments integrate automated conversational search with sourcing answers from community experts. A user has a single point of entry to pose a question in a user communication application. The system takes care of answering the question. If the system is unable to answer the question, it obtains help from community experts. New answers are indexed and used to answer future questions.

One or more embodiments rely on machine learning models to: identify whether a question can be answered using the existing knowledge base; automatically generate answers from the existing knowledge base; decide between generating a clarifying question and reaching out to experts for help; identify experts on the question topic; distribute requests for help among experts; and enhance an existing knowledge base of indexed question and answer content based on user feedback and expert answers.

6. Computer Networks and Cloud Networks

In one or more embodiments, a user communication management engine is embodied in a computer network providing connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
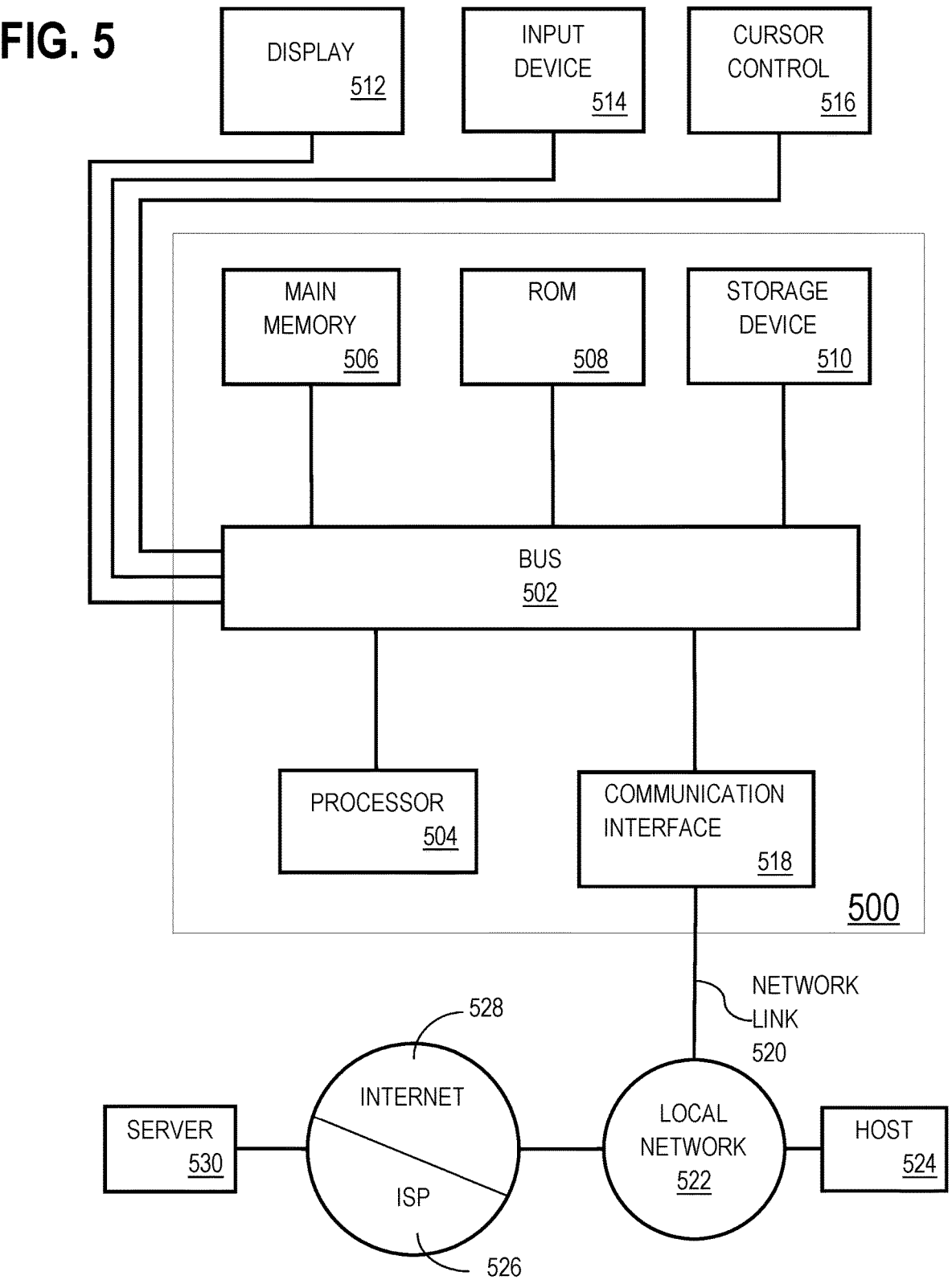
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

monitoring a plurality of user discussion environments, each of the plurality of user discussion environments comprising user-generated questions and user-generated answers posted by users in human-readable language;

detecting a first user-generated question posted in a first user discussion environment of the plurality of user discussion environments;

based at least on the user-generated questions and the user-generated answers comprised in the plurality of user discussion environments, selecting a first user-generated answer and a second user-generated answer, of the user-generated answers, that are relevant to the first user-generated question at least by:

generating a first query comprising a first query term that is based on the first user-generated question;

executing the first query to identify the first user-generated answer that is relevant to the first query term that is based on the first user-generated question;

responsive to identifying the first user-generated answer that is relevant to the first query term that is based on the first user-generated question: selecting the first user-generated answer for formulating a system-composed answer to the first user-generated question;

generating a second query comprising a second query term that is based on the first user-generated question;

executing the second query to identify the second user-generated answer that is relevant to the second query term that is based on the first user-generated question;
responsive to identifying the second user-generated answer that is relevant to the first query term that is based on the first user-generated question: selecting the second user-generated answer for formulating the system-composed answer to the first user-generated question;
generating, by a system, the system-composed answer to the first user-generated question based on combining content corresponding at least to (a) a first portion of the first user-generated answer and (b) a second portion of the second user-generated answer; and
posting, by the system, the system-composed answer on the first user discussion environment in response to the first user-generated question,
wherein generating the system-composed answer to the first user-generated question comprises:
encoding the first user-generated answer as a first embedding;
encoding the second user-generated answer as a second embedding; and
applying an answer-generating machine learning model to the first embedding and the second embedding to generate a human-readable answer including content from the first user-generated answer and the second user-generated answer.

2. The medium of claim 1, wherein generating the system-composed answer comprises:
summarizing the first user-generated answer to generate the first portion;
summarizing the second user-generated answer to generate the second portion; and
combining the first portion summarizing the first user-generated answer with the second portion summarizing the second user-generated answer.

3. The medium of claim 1, wherein the operations further comprise:
responsive to identifying a third user-generated answer that is relevant to the first query term that is based on the first user-generated question: selecting the third user-generated answer for formulating the system-composed answer to the first user-generated question;
determining that the first user-generated answer and the third user-generated answer provide different information associated with a same query term in the first user-generated question; and
based on determining that the first user-generated answer and the third user-generated answer provide different information associated with the same query term:
generating the system-composed answer based further on combining a third portion of the third user-generated answer with the first portion of the first user-generated answer and the second portion of the second user-generated answer.

4. The medium of claim 1, wherein the operations further comprise:
generating a confidence score associated with the system-composed answer;
based on determining that the confidence score is below a threshold:
requesting from a human expert an expert-generated answer to the first user-generated question; and
displaying the expert-generated answer in the first user discussion environment.

5. A method, comprising:
monitoring a plurality of user discussion environments, each of the plurality of user discussion environments comprising user-generated questions and user-generated answers posted by users in human-readable language;
detecting a first user-generated question posted in a first user discussion environment of the plurality of user discussion environments;
based at least on the user-generated questions and the user-generated answers comprised in the plurality of user discussion environments, selecting a first user-generated answer and a second user-generated answer, of the user-generated answers, that are relevant to the first user-generated question at least by:
generating a first query comprising a first query term that is based on the first user-generated question;
executing the first query to identify the first user-generated answer that is relevant to the first query term that is based on the first user-generated question;
responsive to identifying the first user-generated answer that is relevant to the first query term that is based on the first user-generated question: selecting the first user-generated answer for formulating a system-composed answer to the first user-generated question;
generating a second query comprising a second query term that is based on the first user-generated question;
executing the second query to identify the second user-generated answer that is relevant to the second query term that is based on the first user-generated question;
responsive to identifying the second user-generated answer that is relevant to the first query term that is based on the first user-generated question: selecting the second user-generated answer for formulating the system-composed answer to the first user-generated question;
generating, by a system, the system-composed answer to the first user-generated question based on combining content corresponding at least to (a) a first portion of the first user-generated answer and (b) a second portion of the second user-generated answer; and
posting, by the system, the system-composed answer on the first user discussion environment in response to the first user-generated question,
wherein generating the system-composed answer to the first user-generated question comprises:
encoding the first user-generated answer as a first embedding;
encoding the second user-generated answer as a second embedding; and
applying an answer-generating machine learning model to the first embedding and the second embedding to generate a human-readable answer including content from the first user-generated answer and the second user-generated answer.

6. The method of claim 5, wherein generating the system-composed answer comprises:
summarizing the first user-generated answer to generate the first portion;
summarizing the second user-generated answer to generate the second portion; and combining the first portion summarizing the first user-generated answer with the second portion summarizing the second user-generated answer.

7. The non-transitory computer readable medium of claim 1, wherein the operations further comprise:
determining the first user-generated question contains insufficient information to generate an answer;
generating a clarifying question in the first user discussion environment; and
detecting the second portion of the second user-generated answer responsive to the clarifying question in the first user discussion environment.

8. The non-transitory computer readable medium of claim 1, wherein the operations further comprise:
determining whether any stored user-generated answer matches each of the one or more query terms; and
based on determining that no stored user-generated answer matches each of the one or more query terms, generating the system-composed answer.

9. The method of claim 5, further comprising:
responsive to identifying a third user-generated answer that is relevant to the first query term that is based on the first user-generated question: selecting the third user-generated answer for formulating the system-composed answer to the first user-generated question;
determining that the first user-generated answer and the third user-generated answer provide different information associated with a same query term in the first user-generated question; and
based on determining that the first user-generated answer and the third user-generated answer provide different information associated with the same query term:
generating the system-composed answer based further on combining a third portion of the third user-generated answer with the first portion of the first user-generated answer and the second portion of the second user-generated answer.

10. The method of claim 5, further comprising:
generating a confidence score associated with the system-composed answer;
based on determining that the confidence score is below a threshold:
requesting from a human expert an expert-generated answer to the first user-generated question; and
displaying the expert-generated answer in the first user discussion environment.

11. The method of claim 5, further comprising:
determining the first user-generated question contains insufficient information to generate an answer;
generating a clarifying question in the first user discussion environment; and
detecting the second portion of the second user-generated answer responsive to the clarifying question in the first user discussion environment.

12. The method of claim 5, further comprising:
determining whether any stored user-generated answer matches each of the one or more query terms; and
based on determining that no stored user-generated answer matches each of the one or more query terms, generating the system-composed answer.

13. A system comprising:
one or more processors; and
memory storing instructions that, when executed by the one or more processors, cause the system to perform operations comprising:
monitoring a plurality of user discussion environments, each of the plurality of user discussion environments comprising user-generated questions and user-generated answers posted by users in human-readable language;
detecting a first user-generated question posted in a first user discussion environment of the plurality of user discussion environments;
based at least on the user-generated questions and the user-generated answers comprised in the plurality of user discussion environments, selecting a first user-generated answer and a second user-generated answer, of the user-generated answers, that are relevant to the first user-generated question at least by:
generating a first query comprising a first query term that is based on the first user-generated question;
executing the first query to identify the first user-generated answer that is relevant to the first query term that is based on the first user-generated question;
responsive to identifying the first user-generated answer that is relevant to the first query term that is based on the first user-generated question: selecting the first user-generated answer for formulating a system-composed answer to the first user-generated question;
generating a second query comprising a second query term that is based on the first user-generated question;
executing the second query to identify the second user-generated answer that is relevant to the second query term that is based on the first user-generated question;
responsive to identifying the second user-generated answer that is relevant to the first query term that is based on the first user-generated question: selecting the second user-generated answer for formulating the system-composed answer to the first user-generated question;
generating, by the system, the system-composed answer to the first user-generated question based on combining content corresponding at least to (a) a first portion of the first user-generated answer and (b) a second portion of the second user-generated answer; and
posting, by the system, the system-composed answer on the first user discussion environment in response to the first user-generated question,
wherein generating the system-composed answer to the first user-generated question comprises:
encoding the first user-generated answer as a first embedding;
encoding the second user-generated answer as a second embedding; and
applying an answer-generating machine learning model to the first embedding and the second embedding to generate a human-readable answer including content from the first user-generated answer and the second user-generated answer.

14. The system of claim 13, wherein generating the system-composed answer comprises:
summarizing the first user-generated answer to generate the first portion;
summarizing the second user-generated answer to generate the second portion; and
combining the first portion summarizing the first user-generated answer with the second portion summarizing the second user-generated answer.

15. The system of claim 13, wherein the operations further comprise:

responsive to identifying a third user-generated answer that is relevant to the first query term that is based on the first user-generated question: selecting the third user-generated answer for formulating the system-composed answer to the first user-generated question;

determining that the first user-generated answer and the third user-generated answer provide different information associated with a same query term in the first user-generated question; and based on determining that the first user-generated answer and the third user-generated answer provide different information associated with the same query term:

generating the system-composed answer based further on combining a third portion of the third user-generated answer with the first portion of the first user-generated answer and the second portion of the second user-generated answer.

16. The system of claim 13, wherein the operations further comprise:

generating a confidence score associated with the system-composed answer;

based on determining that the confidence score is below a threshold:

requesting from a human expert an expert-generated answer to the first user-generated question; and displaying the expert-generated answer in the first user discussion environment.

17. The system of claim 13, wherein the operations further comprise:

determining the first user-generated question contains insufficient information to generate an answer;

generating a clarifying question in the first user discussion environment; and detecting the second portion of the second user-generated answer responsive to the clarifying question in the first user discussion environment.

* * * * *